March 8, 1949. W. T. DOWNING ET AL 2,464,123
ROTARY PLUG VALVE
Filed June 11, 1946
FIG. 1
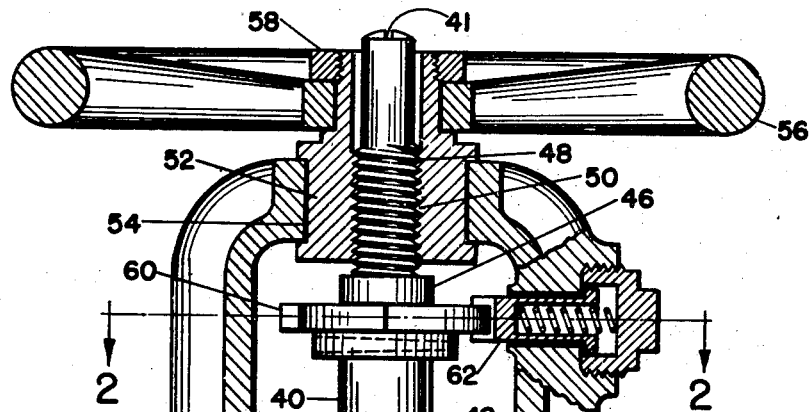
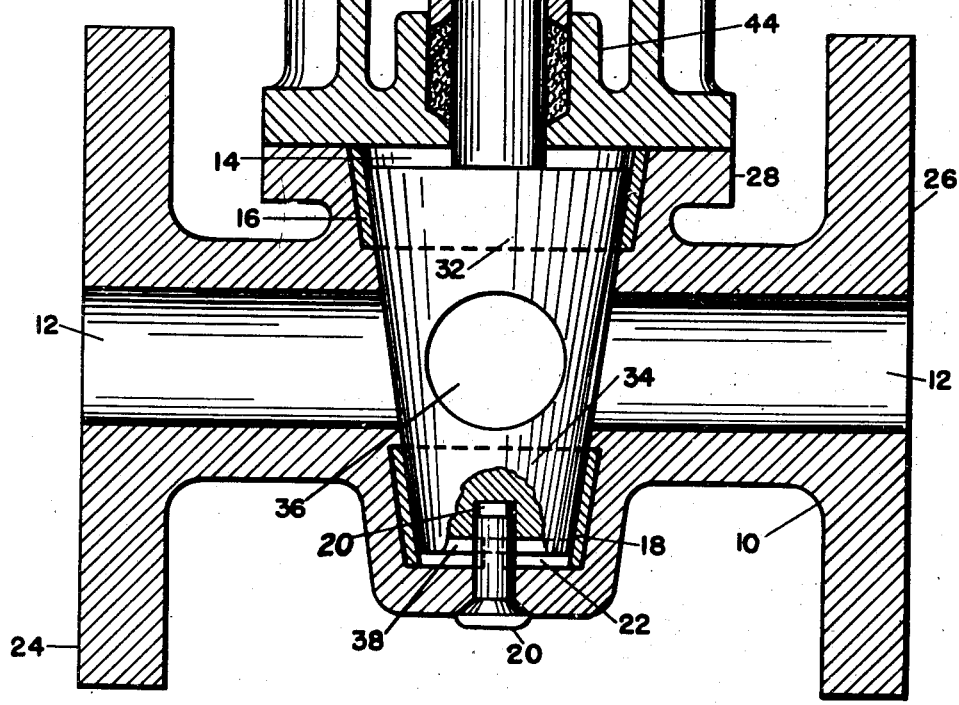
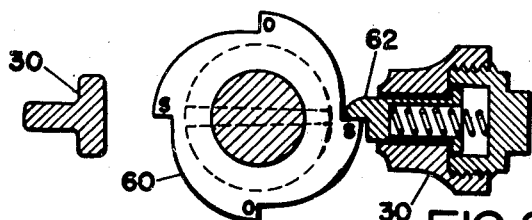
FIG. 2
INVENTORS
WILLIS T. DOWNING
SIDNEY P. JOHNSON
By M. O. Hayes
Attorney Patented Mar. 8, 1949

2,464,123

UNITED STATES PATENT OFFICE 2,464,123

ROTARY PLUG VALVE

Willis T. Downing, Alexandria, Va., and Sidney P. Johnson, Washington, D. C.

Application June 11, 1946, Serial No. 676,046

2 Claims. (Cl. 251—97)

(Granted under the act of March 3, 1883, as amended April 30, 1928; 370 O. G. 757)

This invention relates to a rotary plug valve which is axially movable; and in particular to a rotary plug valve which does not rotate with respect to the valve seat when in seated position.

Axially movable rotary plug valves are known in the art in which the plug is adapted to be lifted from its seating contact before rotation to open position. These valves are generally provided with two operating hand wheels which separately function to lift the plug and to rotate it. Or they may be of other design involving a complicated system of levers, guides and spring-actuated stops which make the valve defective in operation. In most cases present art valves of this type operate in the open position with the rotary plug in unseated position. This is a defect which permits the fluid being controlled to pass around the plug and in some cases to be in contact with the packing in the valve stem packing gland. Such construction has a deleterious effect on the valve seat and also the packing and valve stem.

With these defects in view it is, therefore, an object of this invention to provide an improved valve of the rotary axially movable plug type which is adapted to be lifted from contact with its seat before either opening or closing the valve.

It is also an object of this invention to provide a valve of the rotary axially movable plug type which cannot be rotated when the plug is in contact with its valve seat.

It is a further object of this invention to provide a valve of the rotary, axially movable plug type which is adapted to be operated by a single hand wheel.

It is an additional object of this invention to provide a valve of the rotary, axially movable plug type, which by reason of the fact that the plug is seated when in either open or closed position, is adapted for service in salt water, gasoline or high pressure steam lines, and It is a still further object of this invention to provide a valve of the rotary, axially movable plug type which is of simple, sturdy construction and capable of economical manufacture.

In order that a clear conception may be had of the construction by which these objectives are attained, reference is now made to the drawings which are illustrative of a preferred embodiment of the invention and in which Figure 1 is a longitudinal vertical section taken on the median plane through the valve assembly showing the relationship of the valve parts to each other, and Figure 2 is a partial sectional view taken on line 2—2 of Figure 1 looking in the direction indicated by the arrows. It shows the relationship of the rotation limiting and indexing cam to the spring actuated pawl.

In the drawings 10 represents a valve body which is provided with passageway 12 extending therethrough for the conduction of fluid. Body 10 is provided with a frustro-conically shaped cavity 14 which is positioned centrally of the body on the median axis at right angles to the center line of passage 12. Cavity 14 is provided with valve seats 16 and 18. The bottom of valve body 10 is provided with a countersunk pin 20 which is centered on the above median axis and projects into cavity 14. The interior face of the bottom of body 10 is provided with transverse ribs 22 which are positioned at right angles to each other and with one rib parallel with passageway 12. Valve body 10 is provided with conventional flanges 24 and 26 which are adapted to be connected to pipe lines in the usual manner. Body 10 is also provided with flange 28 which is adapted to support yoke 30. Rotary plug 32 is frustro-conical in shape. It is adapted to fit within cavity 14 and is provided with seats 32 and 34 to contact valve seats 16 and 18 respectively. Plug 32 is provided with a transverse passageway 36 which matches with passageway 12 when in open seated position. Plug 32 is provided with transverse slots 38 and an opening 20' in its bottom which are adapted to interfit with transverse ribs 22 and pin 20 respectively. Valve stem 20' extends from the larger end of plug 32 through packing gland 42 which is adapted to engage boss 44 in the base of yoke 30. Stem 40 is of uniform diameter to shoulder 46 where its diameter is reduced and is provided with right hand threads as at 48 which are adapted to match threads 50 in bushing 52. The end of stem 40 is provided with a slot 41 which is positioned in parallel with passageway 36. This slot thus readily indicates the position of passageway 36.

Bushing 52 is journaled in the arms of yoke 30 as at 54 and is free to rotate with respect thereto. Bushing 52 extends through the hub of handwheel 56 and is firmly attached thereto by means of locknut 58 which threadedly engages the extension of bushing 52 and clamps the hub of handwheel 56 between a shoulder on the bushing and itself. The large portion of stem 40 is provided with a four tooth indexing cam 60 which is adapted to engage spring biased pawl 62 which is mounted in an arm of yoke 30. These teeth are indexed with the letter O or S to indicate the "open" or "shut" position of the valve. When a tooth of the cam is engaged by pawl 62 rotation of the stem and valve plug in a counterclockwise direction is prevented.

In operation the valve is manipulated as follows: Assuming the valve to be closed and in seated position, hand-wheel 56 is rotated in a clockwise direction. Plug 32 and stem 40 are prevented from rotation by transverse ribs 22 in the bottom of valve body 10 with which the plug is engaged. Bushing 52 rotates with hand-wheel 56 and since its threads which engage stem 40 are right-handed, clockwise rotation of the hand-wheel lifts or "jacks" the valve plug from its seat. At the time at which the valve plug clears ribs 22, shoulder 46 on valve stem 40 jams on the under surface of bushing 52 and valve plug 32 and hand-wheel 56 then rotate as a unit. Hand-wheel 56 is then rotated through an angle of 90° or until pawl 62 drops over the edge of the tooth marked "O" on cam 60. At this point passageway 36 is in alignment with passageway 12. Valve plug 32 is then seated by rotating hand-wheel 56 in a counterclockwise direction until ribs 22 engage slots 38 and the seats on the plug and valve body are in contact with each other. To close the valve the above operations are repeated. First the plug is "jacked" from its seat by a clockwise rotation of the hand-wheel. The valve is then rotated in a clockwise direction until pawl 62 drops over the tooth on cam 60 marked "S" and the hand wheel is then rotated in counter-clockwise direction until the plug is seated.

It is apparent that these inventors have provided a rotary plug valve which never rotates when in seated position, a fact which prevents rapid erosion of the valve seats. Also by reason of the fact that the rotary plug is seated when in open and closed positions the valve can be used in high pressure steam service, on salt water lines, on gasoline lines, i. e. on high duty service.

While the preferred embodiment of the invention is that shown by the drawings, it is not desired to be strictly limited thereto as modifications in the various parts and their relative locations can be made without departing from the spirit or scope of the invention as defined by the herewith appended claims.

The invention described herein may be manufactured and used by or for the Government of the United States of America for governmental purposes without the payment of any royalties thereon or therefor.

We claim:

1. A valve of the rotary, axially movable plug type comprising a valve body having a passageway extending therethrough, a rotary plug adapted to be seated and unseated in the valve body when moved axially, a valve seat extending transversely of the body, said valve seat being of greater length than the plug to allow axial movement of the plug, said plug in its seated position being in contact with the seat, said plug having a transverse passageway adapted to align with the passageway through said body, a frame mounted on said valve body, actuating means including a bushing rotatably mounted in said frame, a valve stem extending from said plug and having a threaded connection with said bushing so that rotation of said bushing relative to said stem effects axial movement of said stem to seat and unseat said plug, means carried by said stem and engageable with said bushing for coupling said stem and bushing for rotation together when said plug is unseated so that rotation of said bushing effects rotation of said plug, and means carried by said frame for opposing rotary movement of said stem in a direction opposite to the direction of rotation of said bushing to rotate the plug whereby when said bushing is rotated in the said opposite direction the plug is moved axially to reseated position.

2. A valve as called for in claim 1 having means for preventing rotation of the plug when the latter is in seated position and substantially until said bushing engageable means carried by the stem is in engagement with the bushing.

WILLIS T. DOWNING.
SIDNEY P. JOHNSON.

REFERENCES CITED

The following references are of record in the file of this patent:

UNITED STATES PATENTS

| Number | Name | Date |
| --- | --- | --- |
| 511,510 | Coale | Dec. 26, 1893 |
| 622,875 | Woerner | Apr. 11, 1899 |
| 2,139,632 | Flodin | Dec. 6, 1938 |
| 2,238,385 | Foster | Apr. 15, 1941 |